United States Patent
Al-Qattan et al.

(10) Patent No.: US 7,632,596 B2
(45) Date of Patent: Dec. 15, 2009

(54) DISTRIBUTED FEED FUEL CELL STACK

(75) Inventors: Ayman M. Al-Qattan, Kaifan (KW);
Donald J. Chmielewski, Chicago, IL (US); Said Al-Hallaj, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 596 days.

(21) Appl. No.: 10/983,166

(22) Filed: Nov. 5, 2004

(65) Prior Publication Data

US 2005/0123821 A1 Jun. 9, 2005

Related U.S. Application Data

(60) Provisional application No. 60/517,463, filed on Nov. 5, 2003.

(51) Int. Cl.
*H01M 2/14* (2006.01)
(52) U.S. Cl. .............................. 429/38; 429/34; 429/39
(58) Field of Classification Search ................... 429/39, 429/34, 38
See application file for complete search history.

(56) References Cited

U.S. PATENT DOCUMENTS

| | | | | |
|---|---|---|---|---|
| 5,342,706 | A * | 8/1994 | Marianowski et al. | 429/35 |
| 6,773,845 | B2 * | 8/2004 | Keegan | 429/39 |
| 2003/0211374 | A1 * | 11/2003 | Dehne | 429/26 |
| 2004/0131912 | A1 * | 7/2004 | Keefer et al. | 429/34 |

OTHER PUBLICATIONS

Aguiar, P., Chadwick, D., Kershenbaum, L., 2002. Modeling of an indirect internal reforming solid oxide fuel cell. Chemical Engineering Science 57, pp. 1665-1677.
Ahmed, S., McPheeters, C., Kumar, R., 1991. Thermal-hydraulic model of a monolithic solid oxide fuel cell (Abstract) Journal of Electrochemical Society 138 (9).
Al-Sherehy, F.A., Adris, A.M., Soliman, M.A., Hughes, R., 1998. Avoidance of flammability and temperature runaway during oxidative dehydrogenation using a distributed feed. Chemical Engineering Science 53 (23), pp. 3965-3973.
Badwal, S., 2001. Stability of solid oxide fuel cell components. Solid State Ionics 143, pp. 39-46.
Balachandran, U., Dorris, S.E., Picciolo, J.J., Poeppel, R.B., McPheeters, C.C., Minh, N.Q., 1989. Material and fabrication challenges in the development of monolithic solid oxide fuel cells. Energy Conversion Engineering Conference, vol. 3 IEEE, New York, pp. 1541-1545.
Costamagna, P., Honegger, K., 1998. Modeling of solid oxide heat exchanger integrated stacks and simulation at high fuel utilization. Journal of Electrochemical Society 145 (11), pp. 3995-4006.
Debenedetti, P.G., Vayenas, C.G., 1983. Steady-state analysis of high temperature fuel cells. Chemical Engineering Science 38 (11), Abstract.

(Continued)

*Primary Examiner*—Patrick Ryan
*Assistant Examiner*—Ben Lewis
(74) *Attorney, Agent, or Firm*—Pauley Petersen & Erickson

(57) ABSTRACT

A fuel cell having a distributed fuel feed in which the heat generation profile can be better controlled. Fuel channel stack and system efficiency improvements are achieved.

33 Claims, 12 Drawing Sheets

Discrete Distributed Feed Flow Calculation

OTHER PUBLICATIONS

Fellows, R., Sloetjes, E.W., Ottervanger, R., 1998. Stack networking for system optimisation: an engineering approach. Journal of Power Sources 71, pp. 138-143.

Haynes, C., Wepfer, W.J., 2000. 'Design for power' of a commercial grade tubular solid oxide fuel cell. Energy Conversion and Management 41, Abstract.

Knitter, R., Bauer, W., 2003. Ceramic microfabrication by rapid prototyping process chains. Sadhana, vol. 28, Parts 1 & 2, pp. 307-318.

Koh, J.H., Kang, B.S., Lim, H.C., 2000. Effect of various stack parameters on temperature rise in molten carbonate fuel cell stack operation. Journal of Power Sources 91, pp. 161-171.

Lu, Y., Dixon, A.G., Moser, W.R., Ma, Y.H., 1997a. Analysis and optimization of cross-flow reactors with staged feed policies-isothermal operation with parallel-series irreversible reaction systems. Chemical Engineering Science 52 (8) pp. 1349-1363.

Nguyen, T., Djurado, E., 2001. Deposition and characterization of nanocrystalline tetragonal zirconia films using electrostatic spray deposition. Solid State Ionics 138 (3-4), pp. 191-197.

Sammes, N.M. Ratnaraj, R., Fee, M.G., 1994. The effect of sintering on the mechanical properties of SOFC ceramic interconnect materials, Journal of Materials Science 29, Abstract.

Clarke, S., Dicks, A., Pointon, K., Smith, T., Swann, A., 1997. Catalytic aspects of the steam reforming of hydrocarbons in internal reforming fuel cells. Catal. Today, Abstract.

Yakabe, H., Ogiwara, T., Hishinuma, M., Yasuda, I., 2001. 3-D model calculation for planar SOFC, Journal of Power Sources 102, pp. 144-154.

Achenbach, E., 1994. Three-dimensional and time-dependent simulation of a planar solid oxide fuel cell stack. Journal of Power Sources 49, 333. Abstract.

Selimovic, A., 2002. Modeling of solid oxide fuel cells applied to the analysis of integrated systems with gas turbines. Doctoral Thesis, Department of Heat and Power Engineering, Lund University, Lund, Sweden. Abstract.

Peters, R., Dahl, R., Kluttgen, U., Palm, C., Stolten, D., 2002. Internal reforming of methane in solid oxide fuel cell systems Journal of Power Sources 106, pp. 238-244.

Xia, C., Liu, M., 2002. Microstructures, conductivities, and electrochemical properties of $Ce_{0.9}Gd_{0.1}O_2$ and GDC-Ni anodes for low-temperatures SOFCs, Solid State Ionics 152-153, pp. 423-430.

Xia, C., Rauch, W., Chen, F., Liu, M., 2002. $Sm_{0.5}Sr_{0.5}CoO_3$ cathodes for low-temperature SOFCs, Solid State Ionics 149, pp. 11-19.

Tsai, T., Barnett, S.A., 1997. Increased solid-oxide fuel cell power density using interfacial ceria layers, Solid State Ionics 98, Abstract.

Lu, Y., Dixon, A.G., Moser, W.R., Ma, Y.H., 1997. Analysis and optimization of cross-flow reactors with distributed reactant feed and product removal, Catal. Today, 35, 443. Abstract.

Al-Qattan, A.M., Chmielewski, D.J., Al-Hallaj, S., Selman, J.R., A novel design for solid oxide fuel cell stacks, Chemical Engineering Science 59, pp. 131-137.

* cited by examiner

Single Cell and Co-Flow Fuel Cell Stack.

Solid Temperature Profile for Cross-flow External Reforming [30]

Solid temperature Profile for Cross-flow Internal Reforming SOFC stacks

System Description.

System Description for Energy Balance

Hydrogen to Steam Ratio Profiles for Fuel Cell Channel with High Air Flow Rate.

Solid Temperature Profiles for Fuel Cell Channel with High Air Flow Rate.

Solid Temperature Profiles for Co-flow Fuel Cell Channel with Low Air Flow Rate.

Total Current versus Utilization.

Temperature Profiles under Various Stacks Designs and Inlet Conditions.

Temperature Profiles under Various Stacks Designs and Inlet Conditions.

Temperature Profiles under Various Stacks Designs and Inlet Conditions at High Feed Rate.

CMSR Profiles under Various Stacks Designs and Inlet Conditions at High Feed Rate.

Temperature Profiles under Various Stacks Designs and Air Flow Conditions.

Utilization versus LHV at Different SCRs.

Flow sheet of (a) Conventional Stack Efficiency ($\eta_1$), (b) Modified Stack Efficiency ($\eta_2$), (c) System Efficiency ($\eta_3$).

Conventional Stack Efficiency versus LHV under Various Stacks Designs.

Modified Stack Efficiency versus LHV under Various Stacks Designs.

System Efficiency versus LHV under Various Stacks Designs.

Discrete Distributed Feed Flow Calculation

Channels with Side Feed Design

Flow Profile of the Anode Gas.

DISTRIBUTED FEED FUEL CELL STACK

This application claims priority from U.S. Provisional Application No. 60/517,463 filed 5 Nov. 2003.

BACKGROUND OF THE INVENTION

Discussion of the Related Art

More than ever before, there is a strong need for a more efficient energy conversion device and a low emission power generation system. This demand is a result of strict emission rules and regulations, and the need to slow down the growing demand for fossil fuel. Fuel cells make an excellent candidate because of their high efficiency and very low emissions, which can be described as electrochemical devices that convert chemical energy into electrical energy.

High temperature fuel cells, which are solid oxide fuel cell (SOFC) and molten carbonate fuel cell (MCFC), operate from 650° C. to 1000° C. and can attain an overall net low system efficiency of more than 70%. The high operating temperatures allow for the exhaust temperature to be utilized in bottoming cycles and/or co-generation. In addition, the heat produced can be utilized for the production of the hydrogen fuel needed by the fuel cell, which leads to a higher system efficiency, when compared with low temperature fuel cells. Although there are a number of pathways for hydrogen production, the steam reforming process appears to be the most promising technology, at least with today's technology.

In the reforming process, methane or other gaseous hydrocarbons are combined with steam and heat to produce hydrogen and carbon monoxide. This process can be carried out inside or outside the fuel cell, the former is called internal reforming (IR) and the latter is called external reforming (ER). External reforming is carried out by a number of units. Whereas, internal reforming is carried out inside the fuel cell along side with the electrochemical reaction, which improves system efficiency further. Both the SOFC and the MCFC stacks have some differences in term of their operating conditions, components and electrochemistry; however, they share common problems, including poor thermal and fuel management.

Both internal and external reforming suffer from large temperature variations within the stack. These temperature variations cause severe thermal stresses and material corrosion, which lead to a shorter life-span or even stack damage. Thermal stresses, which usually take place in the SOFC stacks, are due to the large temperature gradients in the solid material of the fuel cell. The fuel cell life span and the rate of deterioration play an important role in the commercialization of high temperature fuel cell systems. It is therefore desirable to improve the life span and the rate of performance deterioration by improving thermal management without impacting stack or system performance.

In the internal reforming, significant synergy exists between the electrochemistry and the steam reforming reactions. In particular, electrochemically generated heat can be used to drive the endothermic reforming reaction, which leads to an improved thermal efficiency. Furthermore, the reforming reaction produces hydrogen and consumes steam, which is the product of the electrochemical reaction. Unfortunately, a mismatch in reaction kinetics prevents the full attainment of this synergy. In particular, the carbon deposition reaction kinetics, which allows for carbon depositing side reactions to occur unless expensive pre-heated steam is added to the methane feed. The steam addition will lead the hydrogen fuel to be diluted. More efficient thermal and material integration between the reforming and electrochemical reactions is therefore desired to lead to a significant improvement in stack and system efficiencies.

SUMMARY OF THE INVENTION

The present invention allows the fuel or oxidant or both to be fed incrementally and distributed around the stack to achieve spatial uniformity of the reaction leading to improved thermal management without imparting stack or system performance. The result is a fuel cell with improved thermal distribution, mass and thermal integration, higher power densities, higher stack and system efficiencies, lower thermal stresses, and faster response while improving life span and rate of performance deterioration for the cell. A great practical effect for IR fuel cells of the present invention can be achieved through a large reduction of steam used in the IR fuel cells thus making a big difference in capital and operational costs. The present invention may further reduce the need for preforming fuel/oxidant mixtures.

Thus it is among the objects of the present invention to provide a distributed feed fuel cell having an apparatus for providing at least one of a fuel or oxidant distribution into the fuel cell channel over a plurality of locations. The distributed feed fuel cell may be a solid oxide fuel cell (SOFC) such as one having a flat-plate stack. Alternatively the fuel cell may be a molten carbonate fuel cell (MCFC). In some embodiments the fuel cell will have a plurality of side feed channels leading to distribution channels at a plurality of locations in the fuel cell channel. The distributed feed fuel cell of the present invention has a feed flow rate sufficient to create an equal distribution of the at least one of the fuel or oxidant flow.

The distributed feed fuel cell of the present invention can provide a plurality of discrete locations within the fuel cell including an initial feed location at the front of the fuel cell channel. The distributed feed fuel cell of the present invention can provide a fuel cell of internal steam reforming type or the external steam reforming cell. The distributed feed fuel cell of the present invention can provide the fuel cell with a substantially uniform heat generation profile during operation due to substantially uniform reaction rates along the length of the fuel cell channel. The distributed feed fuel cell of the present invention can provide a uniform temperature profile between about 800° C. and about 1100° C. to ensure efficient operation of the cell. The distributed feed fuel cell of the present invention can provide a substantially uniform current density during operation.

The distributed feed fuel cell of the present invention can provide the fuel cell having a distributed feed flow rate profile such that the hydrogen-to-steam ratio (HSR) is substantially spatially uniform during operation and a preferred steam-to-carbon ratio (SCR) of less than 1:1 for the fuel cell during operation such as a ratio of about 1:2 for the fuel cell during operation.

A distributed feed fuel cell of the present invention may further have a stack of fuel cell channels and apparatus for providing at least one of a fuel or oxidant distribution into the fuel cell channels over a plurality of locations along the length of the fuel cell channels.

BRIEF DESCRIPTION OF THE DRAWING FIGURES

DETAILED DESCRIPTION OF THE PREFERRED EMBODIMENTS

Kinetics and Operation

Figure 1:
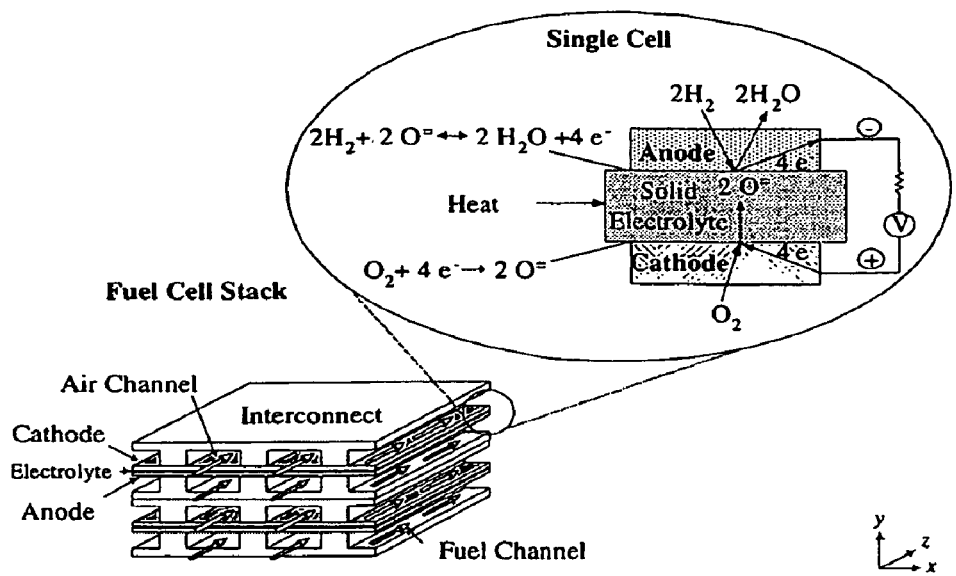
FIG. 1 illustrates a single cell and a co-flow fuel cell stack.

A fuel cell stack consists of four building blocks, which are anode, cathode, electrolyte and interconnect, as shown in FIG. 1. The oxidant, usually air, is fed on the cathode side to provide the needed oxygen for the electrochemical reaction. In addition, it serves as a coolant, when the fuel cell is hydrogen-fed. However, air provides the heat needed, when the fuel cell stack is methane-fed (i.e., internal reforming stack). The fuel is fed on the anode side. Oxygen ions are conducted by the electrolyte and electrons are conducted by the interconnect 2.1. Equations (2.1) and (2.2) are the anode hydrogen and the cathode electrochemical reactions respectively.

$$H_2 + O^= \rightarrow H_2O + 2e^- \quad (2.1)$$

$$\frac{1}{2}O_2 + 2e^- \rightarrow O^= \quad (2.2)$$

The sum of Equations (2.1) and (2.2) will lead to the cell overall reaction, which is shown below.

$$H_2 + \frac{1}{2}O_2 \rightarrow H_2O \quad (2.3)$$

As the reaction described by Equation (2.3) proceeds, a certain amount of energy is released (at 298K, $\Delta H_{rxn}$=242 kJ/mole). Unfortunately, only a portion of this released energy can be converted to electrical power. Ideally this is given by the Gibbs free energy, $\Delta G_{rxn} = \Delta H_{rxn} - T\Delta S_{rxn}$. The remaining energy must be released as heat; however, in the non-zero current case the proportion shifts towards the production of more heat, due to ohmic, diffusion and kinetic losses.

In the steam reforming process, methane is combined with steam and heat to produce hydrogen and carbon monoxide, Equation (2.4). The carbon monoxide is then further converted by the equilibrium-dominated shift reaction, Equation (2.5). If these reactions occur in units separate from the fuel cell, the hydrogen is termed externally reformed. In the case of high temperature fuel cells, like the SOFC, these reactions can be carried out simultaneous to the electrochemistry, resulting in the internal reforming fuel cell.

$$CH_4 + H_2O \rightarrow 3H_2 + CO \quad (2.4)$$

$$CO + H_2O \leftrightarrows H_2 + CO_2 \quad (2.5)$$

External Reforming Fuel Cell.

A single channel in the typical planar solid oxide fuel cell (SOFC) stack depicted in FIG. 1 may be seen as resembling a classic plug flow reactor (PFR) from the chemical arts. Consider a single hydrogen-fed channel in the fuel flow direction. From the gas-flow perspective it appears that a single exothermic reaction is taking place.

$$H_2 \leftrightarrows H_2O \quad (2.6)$$

Figure 2:
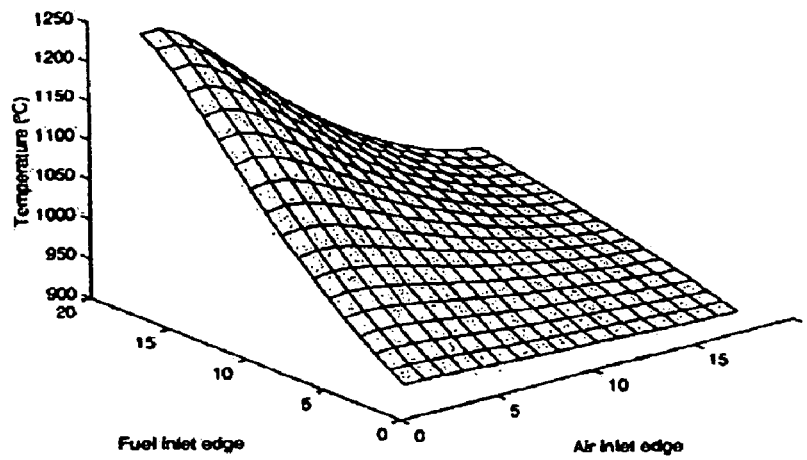
FIG. 2 illustrates a solid temperature profile for cross-flow external reforming.

At the entrance of the channel the concentration of $H_2$ is high, which causes large reaction rates. Toward the end of the channel, equilibrium conditions prevail causing the reaction rate to approach zero. This type of behavior is echoed when we extend the analysis to the heat generation profile, since the rate of heat generation increases with reaction rate. Incorporating temperature dependence on the reaction rate (which increases with temperature) yields a further skewing of the isothermal profiles. This type of behavior has been observed by many authors. A representative sample is shown in FIG. 2.

It should be noted that the reversible arrow in the reaction equation ($H_2 \leftrightarrows H_2O$) is employed to highlight that the reaction rate reaches equilibrium and not all fuel is converted to steam. This equilibrium-like limitation is due to the application of a load voltage on the cell. The reversible arrow is not intended to suggest that any region of the cell is operating in the electrolyzer mode (i.e., $H_2O \rightarrow H_2$).

Internal Reforming Fuel Cell.

A number of authors have expressed the potential benefits of combining SOFC electrochemistry with steam reforming. In particular, Clarke et al. in "Catalytic aspects of the steam reforming of hydrocarbons in internal reforming fuel cells" (*Catalysis Today,* 38:411-423, 1997) state that:

Application of internal reforming offers several further advantages compared with external reforming: 1) System cost is reduced because the separate steam reformer unit is not needed, 2) With internal reforming, less steam is required (the anode reaction produces steam), 3) There is a more evenly distributed load of hydrogen in an internal reforming cell, which may result in a more uniform temperature distribution, 4) There is higher methane conversion.

On the downside, Clarke et al. also state that modifications of stack hardware may be required, conventional catalysts may be poisoned by impurities, and flexibility of operation may be reduced. Numerous studies present clear evidence that temperature non-uniformity is present in a flat-plate SOFC stack. Peters et al. in "Internal reforming of methane in solid oxide fuel cell systems" (*Journal of Power Sources*, 106:238-244, 2002) state that, "Large temperature gradients in either direction can cause damage to one or more of the components or interfaces due to thermal stresses." Furthermore, Yakabe et al. in "3-d model calculation for planar sofc" (*Journal of Power Sources*, 102:144-154, 2001) state that, "... the internal stress would cause cracks or destruction of the electrolytes." In addition, Haynes et al. in "'design for power' of a commercial grade tubular solid oxide fuel cell" (*Energy Conversion & Management*, 41:1123-1139, 2000) state that, "Internal reforming has a negative impact on power generation due to the diluting effect of recirculated stack exhaust."

Figure 3:
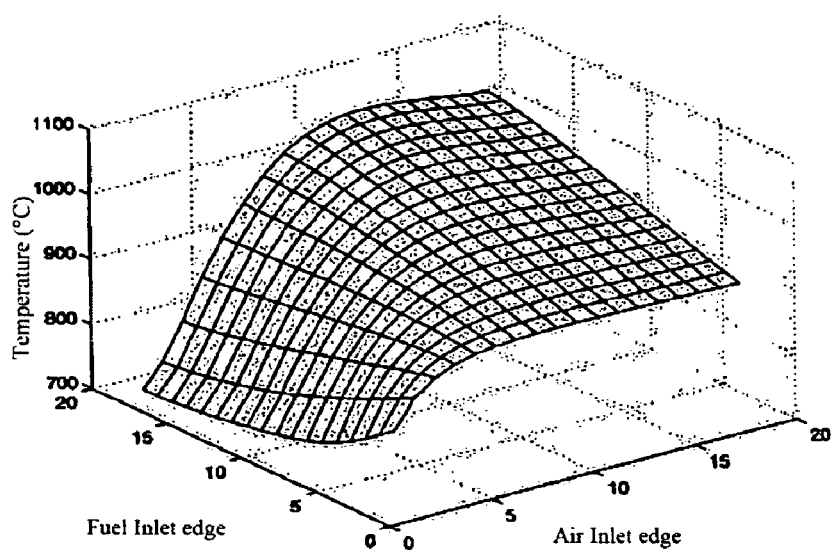
FIG. 3 illustrates a solid temperature profile for cross-flow internal reforming stacks.

From a materials perspective we find that the SOFC is limited in operating temperature from two sides. On the one hand, the ionic conductivity of the electrolyte (yttria-stabilized zirconia, YSZ) drops off at low temperatures. This suggests that for a particular region of the fuel cell to be active, it must have a temperature greater than about 800-900° C., with fewer losses occurring at higher temperatures. From the other side, we find that the maximum temperature of a stack is limited by the chemical stability of the interconnect and electrode materials as well as the stability of the contact interfaces. Thus, the maximum temperature at any point in the stack must be less than about 1000-1100° C. Now consider the hydrogen-fed profile of FIG. 2. Clearly, the operating temperature of the stack is limited by the maximum achieved at the upper left corner. Additionally, the low temperatures at the lower right corner of the stack will result in lower electrochemical activity due to increased ionic resistance of the electrolyte. A similar type analysis of the internal reforming case (FIG. 3) indicates that the first third of the fuel channel is dominated by endothermic reforming, while most electrochemical activity occurs in the remaining two-thirds (reminiscent of the external reforming configuration). From these observations, we conclude that a flattening of the temperature profile will bring the maximum and minimum stack temperatures closer. This will allow the average stack temperature to be raised (providing greater utilization of the YSZ electrolyte), while reducing the maximum stack temperature (allowing for the use of less expensive interconnect and electrode materials).

Another important issue (pertaining more directly to operational economics) is the need to feed excess pre-heated steam with the hydrocarbon fuel (a known typical rule of thumb is an inlet steam-to-carbon ratio (SCR) of 2:1). This appears to be counter-intuitive since the product of the electrochemical reaction is steam.

$$4H_2 + 2O^= \rightleftharpoons 4H_2O + 8e^-$$

$$CH_4 + H_2O \rightarrow 3H_2 + CO$$

$$CO + H_2O \rightleftharpoons H_2 + CO_2$$

$$CH_4 + 4O^= \rightarrow 2H_2O + CO_2 + 8e^-$$

The required excess steam is due to the fact that carbon-depositing reactions will prevail in the initial portions of the channel in the absence of steam. If we can safely reduce the amount of steam in the feed, then a significant reduction in operating cost can be achieved, due to less pre-heating duty. In addition, removal of steam by the reforming reaction will serve to push the electrochemical reaction towards further utilization of hydrogen. Based on these observations, our underlying design objective is to eliminate carbon deposition in the face of reduced steam content in the fuel feed.

Stack Designs.

Integrated internal reforming (IIR) is discussed in the art in which an endothermic reforming reaction is carried out adjacent to the fuel cell reaction (unlike internal reforming where the two reactions take place in the same vessel). It is mentioned that this method of heat management is an efficient way of producing hydrogen without the disadvantages of direct internal reforming. Another method discussed in the art employs inter-stage cooling in multistage stacks. In this case, the stack is divided into sub-stacks and between each sub-stack there is a heat exchanger charged with reducing the fuel temperature to the required level. In the art inter-stage hydrogen feeds in multistage stacks have also been discussed.

Distributed Feed Reactors.

The distributed feed chemical reactor configuration, also known as cross flow (but not to be confused with the cross-flow fuel cell configuration) can be found in much of the chemical reaction engineering literature. Distributed feed reactors are used to improve the performance of PFR's by feeding the reactant gradually along the PFR instead of feeding all of the reactants at the inlet. Such a configuration can increase product selectivity and conversion, as well as reduce or eliminate by-products, hot spots and runaway condition. The current effort is the first to apply the distributed feed configuration to a fuel cell system.

Reaction Rates

Electrochemical Reaction.

FIG. 1 shows a typical co-flow stack configuration. It is sufficient to model the channel as PFR operating at steady state conditions, where the reaction described by Equation (2.3) takes place, and as the electrochemical oxidation of carbon monoxide is neglected.

Since the reactor operating conditions are high temperature and low pressure, the ideal gas law can be safely applied, along with the assumption of negligible pressure drop. The oxygen partial pressure on the cathode side will be assumed to be constant, since air is usually fed in excess quantities. Activation losses are neglected because of the rapid chemical kinetics in SOFC. Additionally, diffusion losses can be neglected unless the fuel or oxygen concentrations become very low. In the design stage of this work, the reaction rate is assumed to be independent of temperature, whereas in the simulation and analysis stage, the reaction rate is coupled with the energy balance equations.

The local electrochemical reaction rate can be derived from the local current density j, given by the following expression:

$$j = \frac{E - V}{R} \quad (3.1)$$

where $R = \Sigma \sigma_i l_i$ and V is the load voltage. E is the local Nernst potential, which can be obtained from the relationship:

$$E = E^o + \frac{\mathcal{R} T_s}{n\mathcal{F}} \ln\left(\frac{p_{H_2} p_{O_2}^{0.5}}{p_{H_2O}}\right) \qquad (3.2)$$

where $E_o$ is the ideal cell potential, which can be calculated via the change in Gibbs free energy of the reaction ($-\Delta G_{rxn}/nF$). The change in the Gibbs free energy is calculated from the following correlation:

$$\Delta G_{rxn} = C_1 + C_2 T_s + C_3 T_s^2 \qquad (3.3)$$

The coefficients $C_1$, $C_2$ and $C_3$ are obtained from standard reference tables (J. H. Hirschenhofer et al., *Fuel Cell Handbook*, National Technical Information Service, U.S. Department of Commerce, fourth edition, November 1998). The ratio $p_{H2}/p_{H2O}$ can simply be exchanged for a ratio of concentrations, as we assumed the ideal gas law for both hydrogen and steam.

The local reaction rate can be expressed in terms of current density:

$$r_{H_2} = \frac{j}{hn\mathcal{F}} \qquad (3.4)$$

where h is the fuel cell channel height, which was added to modify the reaction rate expression to better fit into the PFR formulation (typically fuel cell reaction rates are described in terms of channel active area, moles/s m², however in most PFR formulations the reaction rate is with respect to channel volume, moles/s m³). Substituting the current density equation and the Nernst potential into Equation (3.4) leads to the following reaction rate expression:

$$r_{H_2} = \left[\frac{1}{Rhn\mathcal{F}}\left(E_o - V + \frac{\mathcal{R} T_s}{n\mathcal{F}} \ln p_{O_2}^{0.5}\right)\right] + \left[\frac{\mathcal{R} T_s}{Rh(nI)^2}\right]\ln\left(\frac{C_{H_2}}{C_{H_2O}}\right)$$

From the assumptions above, the local reaction rate is a function of the local hydrogen-to-steam ratio (HSR) and solid temperature. Thus, the reaction rate expression can be simplified to:

$$r_{H_2} = \alpha(T_s) + \beta(T_s)\ln\left(\frac{C_{H_2}}{C_{H_2O}}\right) \qquad (3.5)$$

Reforming and Shift Reactions.

In the literature we find a number of expressions aimed at describing the kinetics of steam reforming. Using the results of one such kinetic expression, we define the $CH_4$ generation rate as:

$$r_{CH_4} = -k_{ref} p_{CH_4} \qquad (3.6)$$

where $$\left(\frac{-E}{RT}\right)$$

is the reaction rate constant. It should be noted that this expression was determined under excess steam conditions (i.e., a steam-to-methane ratio (SCR) above two). The rate expression for the generation of $CO_2$, due to the shift reaction, is assumed to be:

$$r_{CO_2} = k_{shift,f}\left(C_{CO} C_{H_2O} - \frac{C_{CO_2} C_{H_2}}{K_{shift,eq}}\right) \qquad (3.7)$$

where $k_{shift,f}$ is the forward shift reaction constant, which is assumed independent of temperature. $K_{shift,eq}$ is the equilibrium constant and can be calculated using the following relationship:

$$\frac{1}{K_{shift,eq}} = \exp\left(\frac{-\Delta H_o}{\mathcal{R} T} - \frac{\Delta\alpha - \Delta S_o}{\mathcal{R}} + \frac{\Delta\alpha \ln T}{\mathcal{R}} + \frac{\Delta\beta}{2\mathcal{R}} + \frac{\Delta\gamma}{6\mathcal{R}} T^2\right) \qquad (3.8)$$

where $\Delta H_o$ is the heat of reaction, $\Delta S$ is the entropy change $\alpha$, $\beta$, and $\gamma$ are the coefficients of the specific heat correlation. These constants are summarized in Table 1.

TABLE 1

The Shift Reaction Parameters

| Parameter | Value |
| --- | --- |
| $\Delta H_o$ (J) | $-4.179 \times 10^4$ |
| $\Delta S$ (J) | $-4.337 \times 10^1$ |
| $\Delta\alpha$ (J) | $-9.306 \times 10^{-1}$ |
| $\Delta\beta$ (J) | $2.382 \times 10^{-2}$ |
| $\Delta\gamma$ (J) | $-1.220 \times 10^{-5}$ |
| $K_{shift,f}$ (mol/m³ s) | $1.2 \times 10^4$ |

Heat Generation Rate

External Reforming.

The local rate of heat generation per unit area is given as the sum of the reversible (first term on the right hand side) and irreversible (second term on the right hand side) heats.

$$\dot{Q} = j\frac{\Delta G_{rxn} - \Delta H_{rxn}}{n\mathcal{F}} + j^2 R \qquad (3.9)$$

Clearly, Equation (3.10) is a function of reaction rate. Therefore, a uniform heat generation profile can be achieved when there is a uniform reaction rate along the length of fuel cell channel.

Internal Reforming.

The local rate of heat generation per unit area is given as:

$$\dot{Q} = \left[j\frac{\Delta G_{rxn} - \Delta H_{rxn}}{n\mathcal{F}} + j^2 R\right] - r_{CH_4} \Delta H_{ref} - h r_{CO_2} \Delta H_{shift} \qquad (3.10)$$

The first term represents the heat generated due to the electrochemical reaction, while the second is the sum of heat consumed by the reforming reaction and heat produced by the shift reaction ($\Delta H_{shift} < 0$).

External Reforming SOFC

Model Development.

Figure 4:
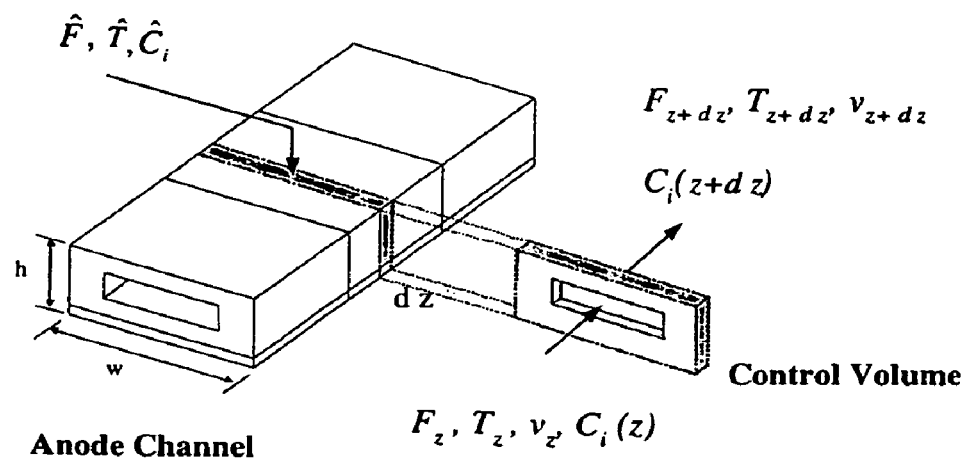
FIG. 4 illustrates a fuel cell system description.

FIG. 4 shows the control volume of interest. In this formulation, we will allow for the introduction of distributed feeds along the length of the channel. To highlight these terms a hat "^" notation will be used for all distributed feed terms. The channel width will also be considered to be a function of z. The reactor width differential equation is given by:

$$\frac{dw}{dz} = u \quad (4.1)$$

where $u(z)$ is the rate of width change. The overall molar balance around the control volume in is given by:

$$\frac{dv}{dz} = \hat{f} - v\left(\frac{u}{w}\right) \quad (4.2)$$

where $\hat{f} = \hat{F}/A$ is the distributed feed volumetric flow rate per reactor volume. The hydrogen and steam balance equations are given as:

$$v\frac{dC_{H_2}}{dz} = \hat{f}(\hat{C}_{H_2} - C_{H_2}) - r_{H_2} \quad (4.3)$$

$$v\frac{dC_{H_2O}}{dz} = \hat{f}(\hat{C}_{H_2O} - C_{H_2O}) + r_{H_2} \quad (4.4)$$

where $\hat{C}_{H_2}$ and $\hat{C}_{H_2O}$ are the hydrogen and steam molar concentration in the distributed feed.

A preliminary analysis of the balance equations leads us to three conceptually important cases. If the width is constant with respect to z and the feed is not distributed (i.e., u=0, and $\hat{f}$=0), then Equations (4.1)-(4.4) simplify to the familiar PFR design equations.

$$\frac{dw}{dz} = 0, \frac{dv}{dz} = 0, v\frac{dC_{H_2}}{dz} = -r_{H_2}, v\frac{dC_{H_2O}}{dz} = r_{H_2}$$

If $\hat{f} \neq 0$ then two special cases arise, depending on our choice of $u(z)$. In the constant width case (u=0), the system model becomes:

$$\frac{dw}{dz} = 0, \frac{dv}{dz} = \hat{f},$$

plus Equations (4.3) and (4.4)

Finally, in the constant velocity case ($u=w\hat{f}/v$), the system model becomes:

$$\frac{dw}{dz} = w\frac{\hat{f}}{v}, \frac{dv}{dz} = 0,$$

plus Equations (4.3) and (4.4)

These three cases represent extreme conditions of the model. In the following section, the distributed feed profile is proposed. This profile will turn out to be valid for both the constant width and constant velocity cases as well as all other choices of $u(z)$.

Design of Distributed Feed Flow Rates.

In this section, the derivations are carried out assuming isothermal conditions (i.e., solid temperature is constant); however, in the Simulation Results section this assumption is removed. Recall that our objective is to minimize temperature variations through a minimization of heat generation variations. As heat generation is a function of current density and current density is an easily measured parameter, the elimination of variations in current density will be our goal. In order to have a uniform current density, the HSR has to be maintained at a constant level. This can be deduced by examining Equations (3.4) and (3.5). Rearranging the reaction rate expression, we find that a set point current density ($j_{sp}$) will be achieved if the HSR is at the following value:

$$\rho_{sp} = \exp\left[\frac{1}{\beta}\left(\frac{j_{sp}}{hn\mathcal{F}} - \alpha\right)\right] \quad (4.5)$$

Unfortunately, in conventional fuel cell designs the HSR will always decrease as the fluid proceeds down the channel length. Define $\rho(z)$ as the actual HSR:

$$\rho(z) = \frac{C_{H_2}(z)}{C_{H_2O}(z)}$$

If we assume the initial HSR is equal to the desired ratio $\rho_{sp}$ (i.e., $\rho(0) = \rho_{sp}$), then:

$$\frac{d\rho}{dz} = \frac{C_{H_2O}\left(\frac{dC_{H_2}}{dz}\right) - C_{H_2}\left(\frac{dC_{H_2O}}{dz}\right)}{(C_{H_2O})^2} = 0$$

will guarantee a uniform HSR. These conditions will yield the following relation:

$$\frac{dC_{H_2}}{dz} = \rho_{sp}\frac{dC_{H_2O}}{dz} \quad (4.6)$$

Note that velocity cancels out from this condition of optimality. This suggests that the expression is valid for all values of $v(z)$, including the constant width and constant velocity systems. Substituting Equations (4.3) and (4.4) into Equation (4.6) and then rearranging yields the following expression for the volumetric flow rate of the distributed feed:

$$\hat{f}^* = \frac{(\rho_{sp} + 1)[\alpha + \beta\ln(\rho_{sp})]}{(\hat{C}_{H_2} - \rho_{sp}\hat{C}_{H_2O})} \quad (4.7)$$

where $$\frac{\hat{C}_{H_2}}{\hat{C}_{H_2O}} > \rho_{sp}$$

must be observed. This equation is the optimal volumetric flow rate of the distributed feed, as it results in $j(z)=j_{sp}$ for all z.

If the distributed feed HSR, $\hat{C}_{H_2}/\hat{C}_{H_2O}$, is less than the set point hydrogen-to-steam ratio, $\rho_{sp}$, then the current density set point cannot be achieved or maintained.

In many cases the initial HSR, $\rho(0)$, will be greater than $\rho_{sp}$. Under such conditions, $\hat{f}$ should be set less than $\hat{f}^*$ until $\rho(z)$ reaches $\rho_{sp}$.

Simulation Results.

The following energy balances, coupled with Equations (3.10), (4.3) and (4.4), represent our non-isothermal model for an external reforming fuel cell channel.

$$(C_T C_p v)_{fuel} A \frac{dT_a}{dz} = \hat{C}_T \hat{C}_p \hat{F}(\hat{T} - T_a) + h_a w(T_s - T_a) \quad (4.8)$$

$$0 = \dot{Q} - h_c(T_s - T_c) - h_a(T_s - T_a) \quad (4.9)$$

$$(C_T C_p v)_{air} A \frac{dT_c}{dz} = h_c w(T_s - T_c) \quad (4.10)$$

This model (depicted in FIG. 5) is a one-dimensional co-flow version of those found in the literature. All physical and thermal properties were assumed constant. Heat transfer by conduction was neglected, and constant coefficients, $h_a$ and $h_c$, were assumed for heat transfer between the solid and gas phases. Although heat transfer by radiation plays a significant role in high temperature fuel cell stacks, we neglected it here. The assumption is that the typical channel is well within the interior of the stack.

The physical dimensions of the simulated conventional channel are as follows: electrolyte thickness is 0.015 cm; electrode thicknesses are 0.005 cm; channel height and width are 0.3 cm and the channel length is 40 cm. The electrodes, electrolyte and interconnect resistivities were calculated using the general form $\sigma_i = a_i + b_i T_s \exp(c_i/T_s)$, the constants $a_i$, $b_i$ and $c_i$ were obtained from the prior art (A. Selimovic. "Modelling of Solid Oxide Fuel Cells Applied to the Analysis of Integrated Systems with Gas Turbines." Doctoral thesis. Lund University. Department of Heat and Power Engineering. P.O. Box 118. S-221 00 Lund. Sweden. April 2002). The electrode interfacial resistance is $0.1 \Omega \cdot cm^2$ (P. Costamanga et al. "Modeling of solid oxide heat exchanger integrated stacks and simulation at high fuel utilization." *Journal of Electrochemical Society*. 145(11):3995-4006, November 1998). The load voltage was assumed to be a constant value of 0.75 V, while the air and fuel inlet temperatures were assumed 1150K and 1160K, respectively. The inlet fuel velocity was 0.40 m/s, and the feed hydrogen and steam mole fractions are 0.97 and 0.03, respectively. The side feed temperature ($\hat{T}$) will be greatly influenced by the bypass configuration of the distributed feed. Initially this gas will be equal to the inlet fuel temperature $T_a(0)$; however, as it travels through the bypass channel it will likely accumulate some heat, depending on the bypass surface temperatures. To approximate this effect we assume $\hat{T}(z)$ to be equal to $T_a(z)$ for all z. Additional simulations with $\hat{T}(z)=T_a(0)$ for all z show little change in the results given below.

Figure 6:
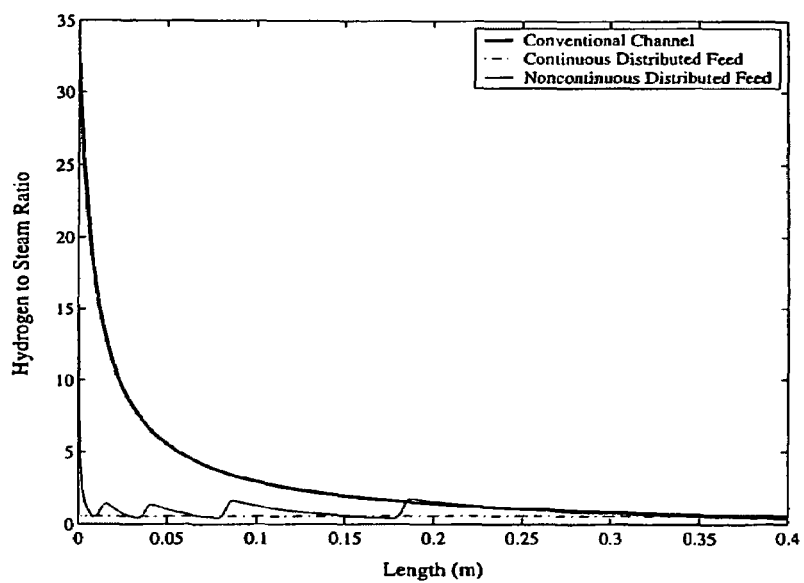
FIG. 6 illustrates the Hydrogen to Steam Ratio (HSR) profiles for a fuel cell channel with a high air flow rate.
Figure 7:
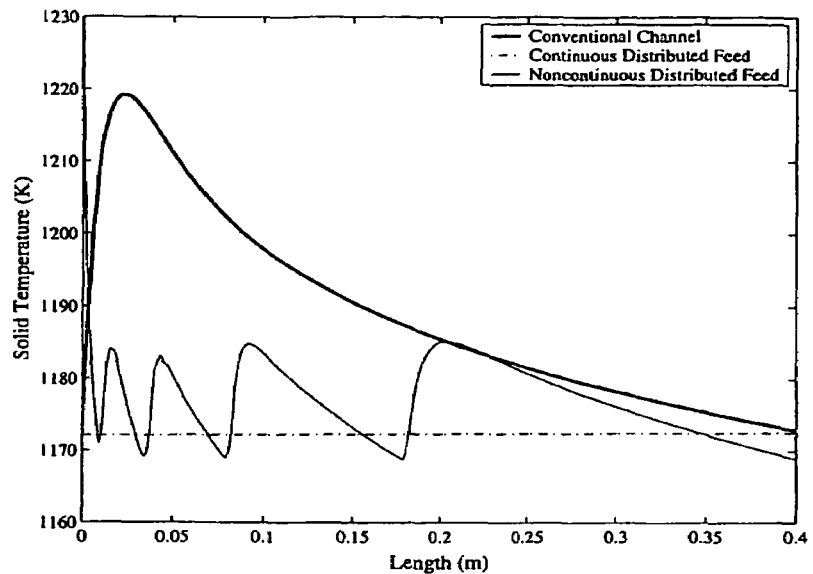
FIG. 7 illustrates solid temperature profiles for a fuel cell channel with a high air flow rate.

FIGS. 6 and 7 show the simulation results for the conventional design. These results are in good agreement with literature data. However, the solid temperature range is somewhat smaller in FIG. 7 as compared to that found in the literature. Approximately 63% fuel utilization was achieved.

Simulations were carried out for the constant width and constant velocity designs using the constant side feed $\hat{f}^*$, which was calculated based on a current density set point of 2500 A/m². The choice of the current density set point is made so that fuel utilization for both designs is the same as in the case of the conventional channel. The total fuel cell active area, and the hydrogen mole fraction in the feed were also set to be the same. The two simulations gave the same results, which were constant HSR and constant temperature profiles (see FIGS. 6 and 7).

One-dimensional simulations corresponding to discrete distributed feed are also found in FIGS. 6 and 7. These results show periodic variations in the HSR and solid temperature. We expect the temperature variations in a real stack to be somewhat smaller than those found in the simulation, due to our neglect of the thermal conduction phenomena.

Figure 8:
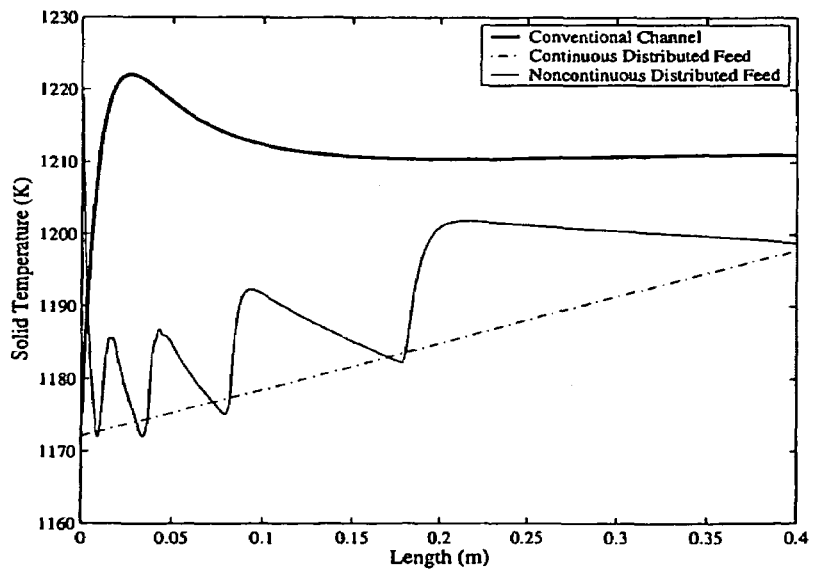
FIG. 8 illustrates solid temperature profiles for a co-flow fuel cell channel with a low air flow rate.

In the above simulations air flow rate is set to a very high value (fuel-to-air flow rate ratio of 1:1000) in attempt to cancel out the effect of cathode gas temperature variation. In FIG. 8, the air flow rate is set to a significantly lower value (fuel-to-air flow rate ratio of 1:50). Clearly, the accumulation of heat in the air stream causes a substantial rise in the average temperature of the solid.

Figure 9:
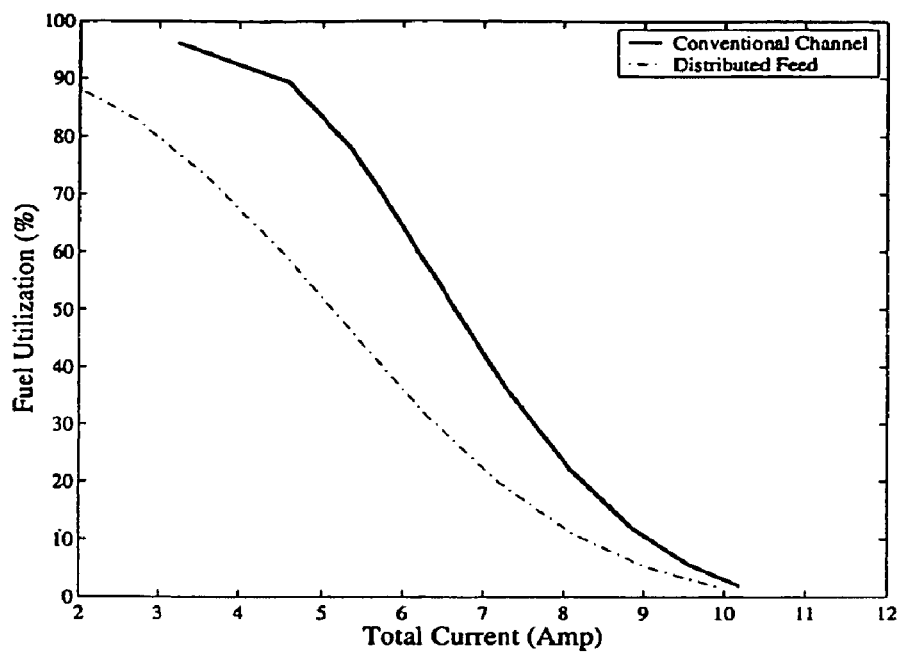
FIG. 9 illustrates total current versus utilization.

FIG. 9 shows that achieving uniform temperature profile comes at a cost, which is lower utilization. In both cases the total active area, inlet temperatures, inlet concentrations and load voltage were the same; however, total fuel flow rate was varied. The total fuel flow rate can be easily calculated for any point in FIG. 9 using the following expression:

$$F_{in} = \frac{\text{Total Current}}{n \times \mathcal{F} \times \text{Utilization} \times C_{H_2}^{in}} \quad (4.11)$$

Internal Reforming SOFC

Model Development.

An overall molar balance around the control volume (see FIG. 4) leads to the following expression for the volumetric flow rate:

$$\frac{dF}{dz} = \hat{F} - \left(\frac{2}{C}\right) A r_{CH_4} \quad (5.1)$$

where $\hat{F}$ is the distributed feed volumetric flow rate per reactor length, A is the cross-sectional area of the channel and C is the molar concentration of an ideal gas at stack temperature and atmospheric pressure. Species balance equations are given as:

$$\frac{d}{dz}(F C_{CH_4}) = \hat{F} \hat{C}_{CH_4} + A r_{CH_4} \quad (5.2)$$

$$\frac{d}{dz}(F C_{H_2}) = \hat{F} \hat{C}_{H_2} + A[r_{H_2} - 3 r_{CH_4} - r_{CO_2}] \quad (5.3)$$

-continued $$\frac{d}{dz}(FC_{H_2O}) = \hat{F}\hat{C}_{H_2O} + A[r_{CH_4} + r_{CO_2} - r_{H_2}] \quad (5.4)$$

$$\frac{d}{dz}(FC_{CO}) = \hat{F}\hat{C}_{CO} + A[r_{CO_2} - r_{CH_4}] \quad (5.5)$$

$$\frac{d}{dz}(FC_{CO_2}) = \hat{F}\hat{C}_{CO_2} - A\,r_{CO_2} \quad (5.6)$$

Although the carbon deposition reactions will have a great impact on the activity of the anode, it is assumed that they will have negligible impact on the material balance of the gas stream. In the simulation section, we will describe how the above model will be used to indicate the possibility of accelerated carbon deposition.

With regard to temperature effects, the following energy balance was applied:

$$-k_s a \frac{d^2 T_s}{dz^2} = \omega \dot{Q} - d_h h_c (T_s - T_c) - d_h h_a (T_s - T_a) \quad (5.7)$$

$$FC_a C_{p_a} \frac{dT_a}{dz} = d_h h_a (T_s - T_a) + \hat{F}\hat{C}_a \hat{C}_p (\hat{T} - T_a) \quad (5.8)$$

$$F_c C_c C_{p_c} \frac{dT_c}{dz} = d_h h_c (T_s - T_c) \quad (5.9)$$

where $T_a$ and $T_c$ are the anode and cathode gas stream temperatures, $h_a$ and $h_c$ are the heat transfer coefficients at the gas solid interfaces, $d_h = 4A/(2(h+w))$ is the hydraulic diameter, w is the channel width, and $F_c$ is the volumetric flow rate of the air stream. The heat capacities per volume ($C_a C_{p_a}$ and $C_c C_{p_c}$) were calculated as $\Sigma_i C_i C_{p,i}$ where $C_i$ and $C_{p,i}$ are the concentration and molar heat capacity of species i.

Design of Distributed Feed Flow Rates

One goal of the present design is to select the distributed feed flow rate profile such that the hydrogen-to-steam ratio (HSR) would be spatially uniform. Achievement of this goal results in a flatting of the current density and heat generation profiles. $\rho_{sp}$, which is defined by Equation (4.5), is the set point hydrogen-to-steam ratio, which corresponds to the desired current density. As in the external reforming formulation the solid temperature will be assumed. Additionally, we assume that the shift reaction proceeds infinitely fast to equilibrium condition. In the simulation section, both of these assumptions will be removed. Now we define the actual HSR as:

$$\rho(z) = \frac{C_{H_2}(z)}{C_{H_2O}(z)}$$

and enforce the condition $d\rho/dz=0$. After a number of algebraic manipulations we find that if $\rho(0)=\rho_{sp}$ and $\hat{F}=\hat{F}^*$ where:

$$\frac{\hat{F}^*}{A} = \frac{(\rho_{sp}^2 + 2\rho_{sp}K_{eq} + 3\rho_{sp} + 4K_{eq})r_{CH_4}^* -}{(\rho_{sp} + K_{eq})(\hat{C}_{H_2} - \rho_{sp}\hat{C}_{H_2O}) +} \quad (5.10)$$

$$(\rho_{sp} - 1)(K_{eq}\hat{C}_{CO} - \rho_{sp}\hat{C}_{CO_2})$$

$$r_{H_2}^* = \alpha + \beta\ln(\rho_{sp}) \quad (5.11)$$

$$r_{CH_4}^* = \frac{1}{\frac{1}{4}\sqrt{(k_r + \hat{F}*C/A)^2 + 8k_r\hat{F}*\hat{C}_{CH_4}/A} - \frac{1}{4}(k_r + \hat{F}*C/A)} \quad (5.12)$$

then the desired HSR uniformity will be achieved. Although this expression is quite complicated and will require the use of a nonlinear equation solver, the attractive feature is that $\hat{F}^*$ is a constant with respect to z. Note that $\hat{C}_{CH_4} = \hat{C}_{CO} = C_{CO_2} = 0$ will result in the re-generation of the expression presented previously (Equation (4.7)) for the external reforming case.

Clearly, the assumptions used to derive this expression will not be totally realistic in the actual operation of the stack, however the expression provides sufficient guidance such that the performance of the stack will be greatly improved.

TABLE 2

Cell Specifications

| | |
|---|---|
| Operating Voltage (Volts) | 0.7 |
| Inlet Fuel Temperature (° K) | 1195 |
| Inlet Air Temperature (° K) | 1195 |
| Channel Height (cm) | 0.1 |
| Channel Width (cm) | 0.3 |
| Channel Length (m) | 0.2 |
| Electrolyte thickness (cm) | 0.0150 |
| Cathode thickness (cm) | 0.005 |
| Anode thickness (cm) | 0.005 |
| Reforming reaction rate constant (mol/sec m² bar) | 4274 |
| Reforming reaction activation energy (J/K mol) | 82000 |
| Forward shift reaction constant | 1.2E04 |

Simulation Results.

Figure 10:
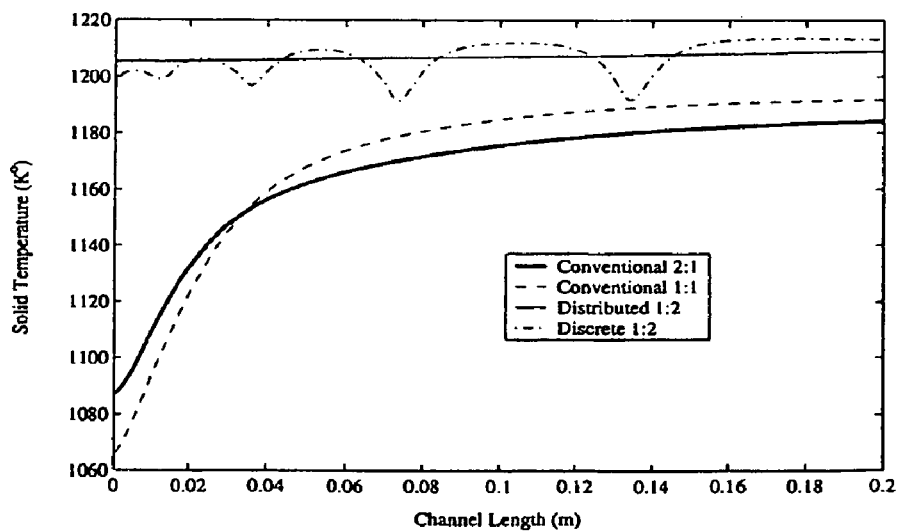
FIG. 10 illustrates temperature profiles under various stack designs and inlet conditions.

In this section, the simulation results presented are indicating the potential performance improvements due to the application of the distributed feed. Here, a typical stack geometry and operating parameters (see Table 2) was selected. In FIG. 10, the reaction surface temperatures of the two configurations are compared. The first two curves represent the conventional SOFC design ($\hat{F}=0$) under inlet SCR's of 2:1 and 1:1. The third curve is for the distributed feed configuration with a low amount of steam in the feed (inlet SCR=1:2). From a spatial uniformity perspective, this profile is a significant improvement over the conventional design. Unfortunately, the concept of a spatially continuous distributed feed is possible only as a mathematical construct. To face this issue we have proposed a discrete injection design aimed at approximating the continuous distributed feed case. The fourth profile of FIG. 10 shows the discrete injection results, again with an inlet SCR=1:2.

Figure 11:
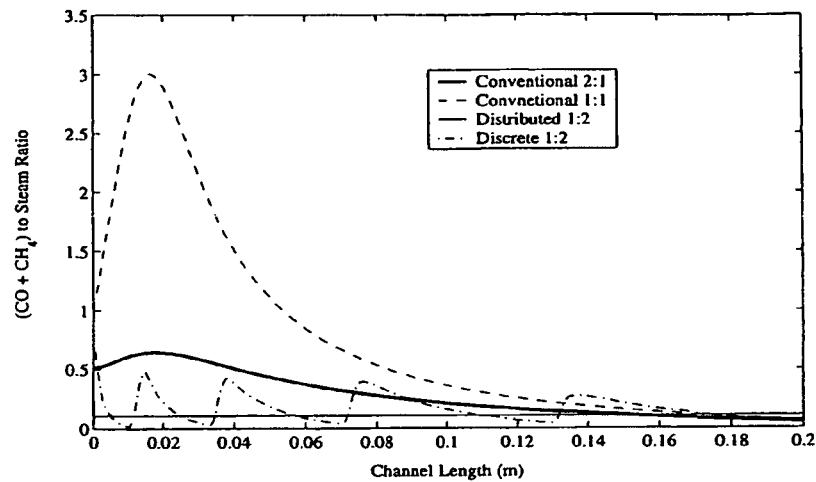
FIG. 11 illustrates temperature profiles under various stack designs and inlet conditions.
Figure 12:
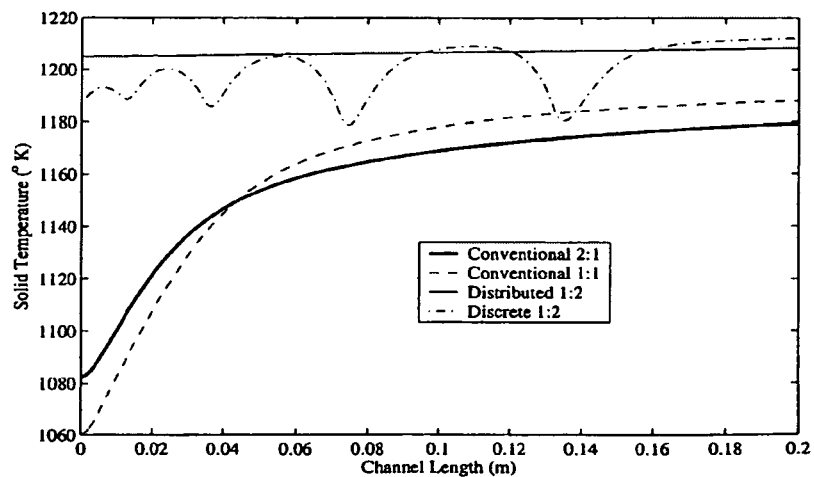
FIG. 12 illustrates temperature profiles under various stack designs and inlet conditions at a high feed rate.
Figure 13:
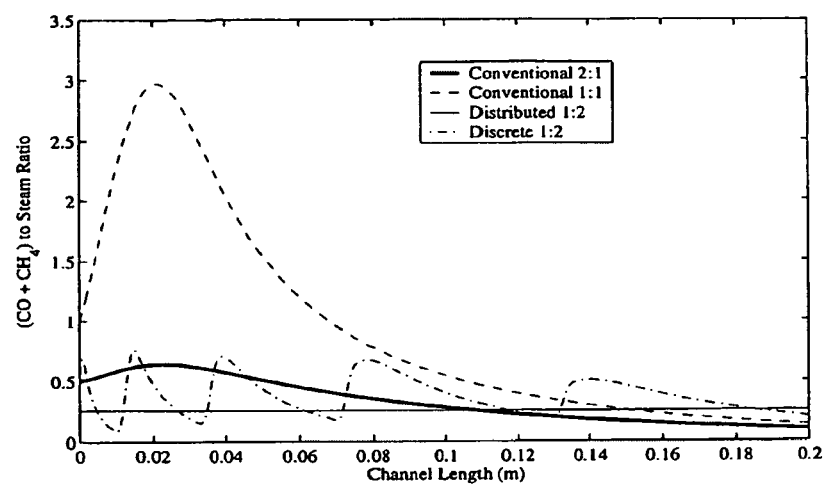
FIG. 13 illustrates CMSR profiles under various stack designs and inlet conditions at a high feed rate.

As discussed previously, we did not consider carbon deposition kinetics explicitly. Instead, we propose the carbon monoxide plus methane-to-steam ratio (CMMSR) as a measure of the carbon deposition rate. FIG. 11 compares the CMMSR for the various configurations. In the conventional design with inlet SCR equal to 2:1, the CMMSR reaches a maximum value of 0.65, very close to the fuel inlet point. If we reduce the inlet SCR to 1:1, then in the conventional design the CMMSR will explode at the inlet, only to fall off slowly as steam is eventually generated by the electrochemistry. This suggests that carbon deposition rates will be unacceptably high near the inlet. In the distributed feed case, with inlet SCR of 1:2, we find the CMMSR to be uniformly equal to 0.15. As this value is less than the maximum found in the conventional excess steam case, we conclude that carbon deposition rates will be acceptable. The last curve of the figure shows the CMMSR profile in the case of discrete injection. Here, the maximum value is about equal to the maximum found in the conventional case; however the SCR has been reduced from 2:1 to 1:2. Variation in Flow Rate.

Figure 5:
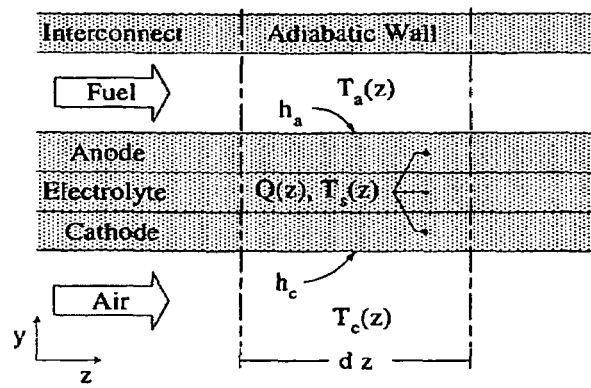
FIG. 5 illustrates a system description for energy balance.

The simulations of FIGS. 5.1 and 5.2 assume a total inlet fuel flow rate of $4.08 \times 10^{-6}$ moles of $CH_4$/sec, or 3.28 J/sec with respect to the Low Heating Value (LHV). If the fuel flow rate is increased to 4.1 J/sec LHV, then as seen in FIG. 5.3 the temperature profiles will change only slightly. A similar conclusion is reached for the CMMSR profiles (see FIG. 5.4). However, it is noted that the choppy behavior of the discrete injection configuration tends to increase with the feed flow rate. As we will see later, this increase especially with respect to CMMSR can be a limiting factor in the operation of DFSOFC.

Figure 14:
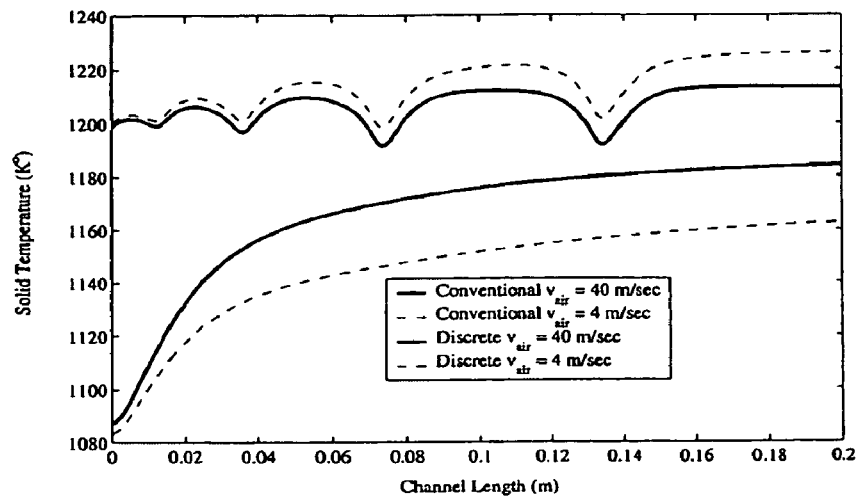
FIG. 14 illustrates temperature profiles under various stack designs and air flow conditions.

Next we consider a modification of the air side flow rate. FIG. 14 indicates that the temperature profile of the conventional design is fairly sensitive to this parameter, while that of the DFSOFC is not. This behavior can be attributed to the improved heat integration of the DFSOFC as a result of spreading out the heat needed by the reforming reaction and heat generated electrochemically over the length of the channel. The poor heat integration of the conventional design leads to thermal deprivation within the stack, which makes it rely heavily on the air side stream as a source of heat.

Fuel Utilization.

We define fuel utilization as fuel consumption rate over fuel feed rate. However, there is some ambiguity as to which component is the fuel (methane, steam or hydrogen). Thus, in our definition we convert all methane to equivalent amounts of steam-reformed hydrogen (i.e., 1 mole of $CH_4$ will eventually be combined with 2 moles of $H_2O$ to yield 4 moles of $H_2$). Thus, the final expression for utilization is:

$$U_t = 1 - \frac{4\, F_{out}C^{out}_{CH_4} + F_{out}C^{out}_{H_2}}{4\, F_{in}C^{in}_{CH_4} + F_{in}C^{in}_{H_2}} \quad (5.13)$$

where $F_{in}$ and $F_{out}$ are the total volumetric flow rates before conversion to the hydrogen basis.

Figure 15:
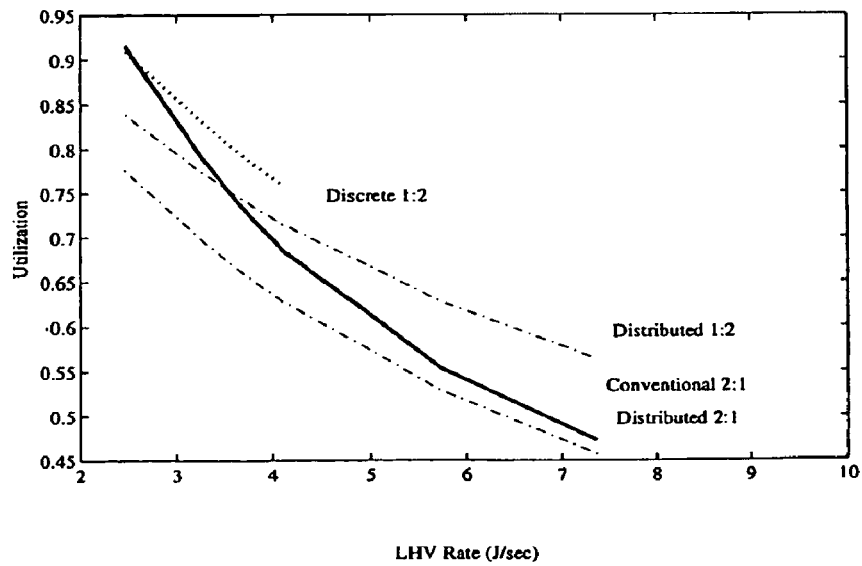
FIG. 15 illustrates utilization versus LHV at different SCRs.

In the hydrogen feed case, it was concluded that the DFSOFC sacrifices fuel utilization to achieve spatial uniformity. In the internal reforming case we observe the same relationship if the inlet SCR's are the same (see FIG. 15). However, if we reduce the SCR, then the DFSOFC utilization will increase, and in some cases surpass, the conventional design. A more surprising result is that the discrete injection configuration will yield even greater utilization. For large LHV rates the discrete distributed feed resulted in CMMSRs in excess of one, and that is not reported. Efficiency.

Figure 16:
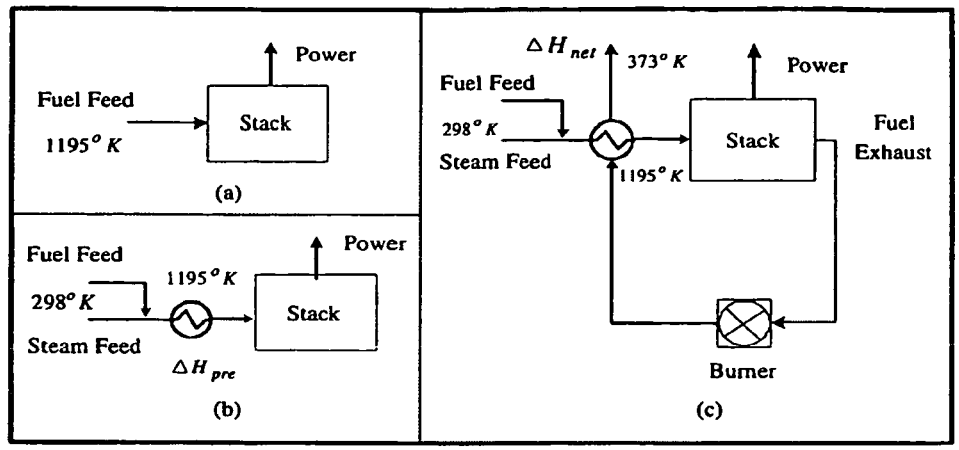
FIG. 16 illustrates a flow sheet of (a) conventional stack efficiency, (b) modified stack efficiency, and (c) system efficiency.
Figure 18:
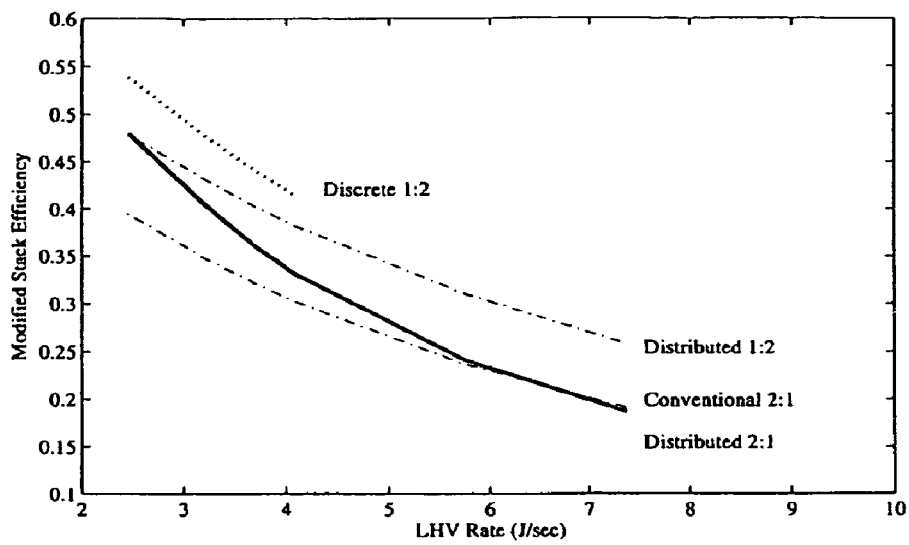
FIG. 18 illustrates modified stack efficiency versus LHV under various stack designs.

The traditional definition of efficiency, $\eta_1$, is the ratio of electrical power, $P_e$, to the LHV of fuel fed to the stack, FIG. 5.7a. A comparison of the various configurations and inlet conditions yields results similar to the utilization-based analysis (see FIG. 5.8). However, the conventional definition of efficiency fails to capture the efficiency aspects occurring outside of the stack. In particular, we define $\Delta H_{pre}$ as the enthalpy required to bring the feed from standard state (298K) to the required inlet condition (1195K). Redefining stack efficiency leads to the following expression:

$$\eta_2 = \frac{P_e}{LHV + \Delta H_{pre}} \quad (5.14)$$

which is represented by FIG. 16b. Using the above definition leads to the curves of FIG. 18. In this figure, it can be seen that the expected drop in efficiency is lowest in the low steam content cases.

Figure 17:
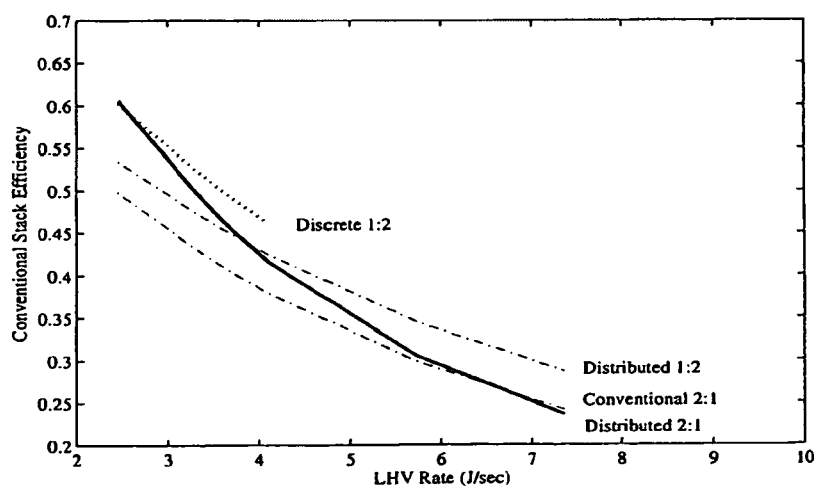
FIG. 17 illustrates conventional stack efficiency versus LHV under various stack designs.
Figure 19:
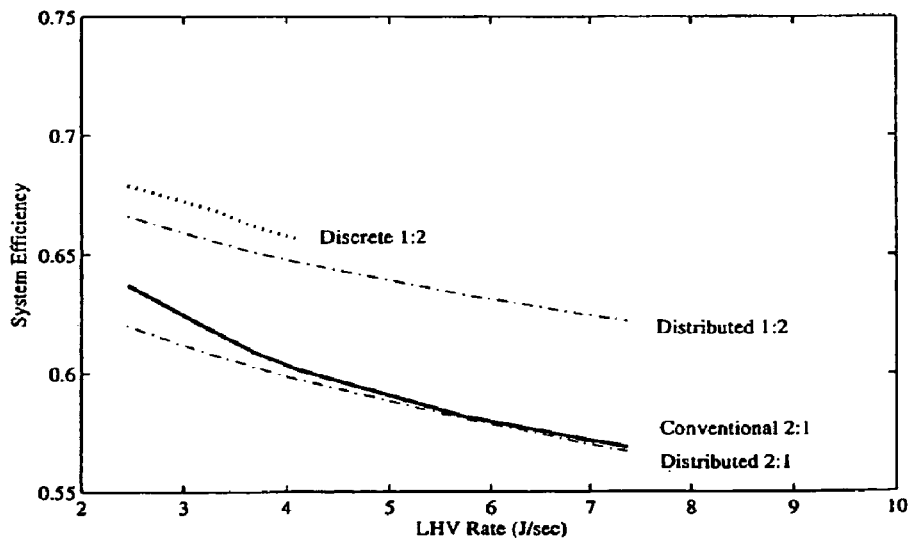
FIG. 19 illustrates system efficiency versus LHV under various stack designs.
Figure 20:
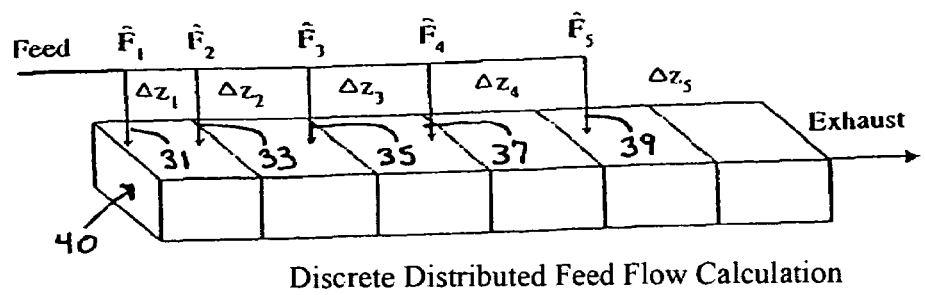
FIG. 20 illustrates a discrete distributed feed flow calculation.

Clearly, the above definition of efficiency is deficient in the sense that the pre-heating duty will likely be supplied by a combustion of the exhaust stream. In all cases considered, the combustion stream contained sufficient energy content and quality to meet all pre-heating requirements. Thus, if no co-generation is assumed, then the efficiency plot of FIG. 17 will be regenerated. In the co-generation case, FIG. 16c, it is assumed that 45% of the remaining heat, $\Delta H_{net}$, can be converted to useful energy, where $\Delta H_{net}$ is the difference between $\Delta H_{post}$ (the enthalpy available in the post-combustion stream, stoichiometric ratio of 2 was used for the air feed and the final state of the steam was assumed to be saturated liquid at 373° C.) and $\Delta H_{pre}$. Thus, the third definition of efficiency is:

$$\eta_3 = \frac{P_e + 0.45\Delta H_{net}}{LHV} \quad (5.15)$$

the results of which are presented in FIG. 19.

To this point we have not considered the efficiency aspects of the oxidant side of the fuel cell. In general, the pre-heating duty of the air stream can be satisfied by its exhaust. This is especially true in the distributed feed configuration, where the air stream will collect heat from the exothermic electrochemical reaction (i.e., the temperature rise will enable a driving force in the air side pre-/post-heat exchanger). In the conventional design, the presence of a cold spot will actually result in a slight drop in air stream temperature. Although these aspects will have a minor impact on the efficiency calculations, the resulting drop in air temperature will necessitate the use of an additional heat exchanger to acquire the final boost in temperature.

Stack Design

Flow and Pressure Drop Calculations.

Figure 21:
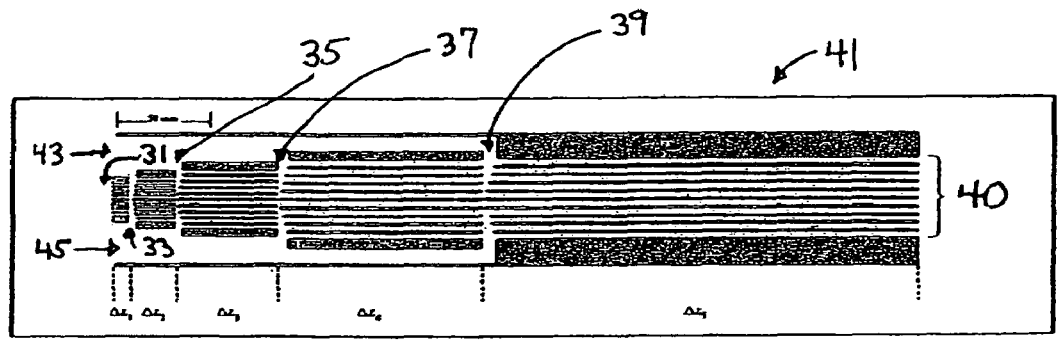
FIG. 21 illustrates channels with a side feed design.
Figure 22:
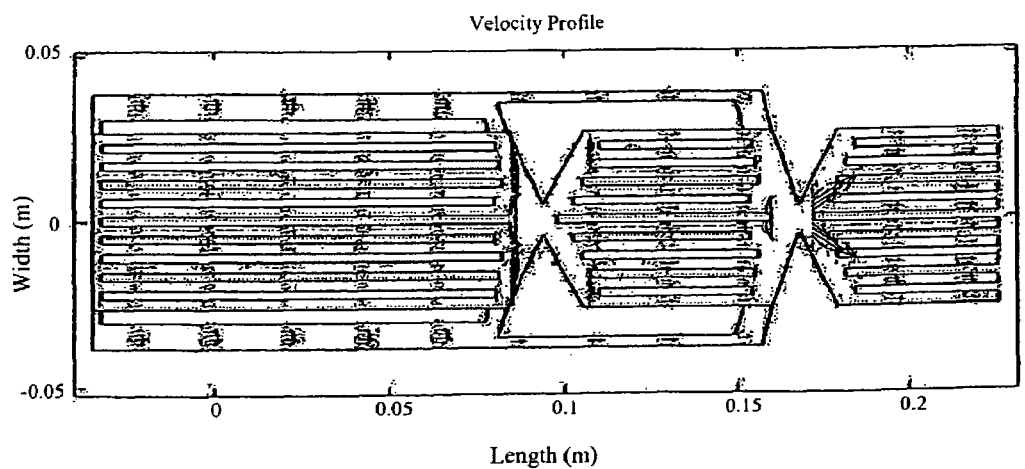
FIG. 22 illustrates a flow profile of the anode gas
Figure 23:
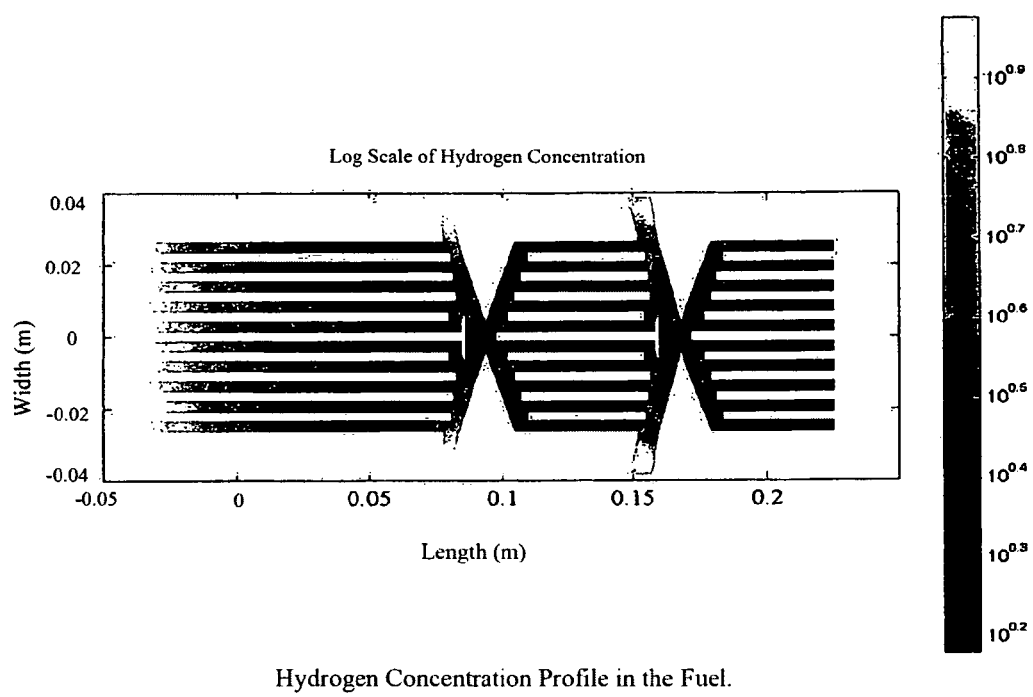
FIG. 23 illustrates a hydrogen concentration profile in the fuel.

In the continuous distributed feed, an implicit assumption of our model is that the distributed fuel injection points form a continuum along the length of the channel (i.e., an infinite number of injection points each with an infinitely small flow rate). Although, use of a permeable membrane may be able to achieve such a continuum, significant technical hurdles must be passed before membrane technology can be applied to a SOFC system. As a result, we must resort to a channel design based on finite injection points along the fuel cell reactor channels for a discrete distributed feed, such as are shown in FIG. 21 between the side feed channel and the fuel cell active area. It is important to note that distributed feed flow rates cannot be influenced directly (i.e., a number of tiny valves cannot be used). To achieve the desired distributed feed flow rates, given by:

$$\hat{F}_i = f^* A_i \Delta z_i \quad (6.1)$$

where $A_i$ and $\Delta z_i$ are the cross-sectional area and length of the $i^{th}$ channel section, we must turn to friction factor calculations based on an assumed pressure drop from fuel inlet to exit. It is interesting to note that based on our simplified friction factor analysis, the channel widths turn out to be the same for different current density set points. That is, a stack designed for a particular set point can also be operated at a different set point without sacrificing the spatial uniformity characteristics. The only required change is the pressure drop from inlet to exit. Clearly, a more detailed finite element analysis of FIG. 21 is required to verify this observation as well as gauge the fuel mixing and distribution characteristics of the design. This analysis will likely lead to further evolution of the design.

Fabrication.

Channel ribs may be fabricated with sophisticated flow patterns by using a molded hot press process. Making a region of the anode surface inactive can be achieved by masking the area of interest with a thin dense layer of yttria-stabilized zirconia. It is proposed that precision masking can be achieved by an electrostatic spray deposition technique.

A distributed feed fuel cell channel will mitigate temperature non-uniformities. The resulting substantially uniform temperature profiles are expected to greatly improve the life span of the fuel cell. However, lower utilizations, in case of the external reforming SOFC, were obtained with the proposed designs compared to the conventional fuel cell.

The distributed feed configuration has the potential of greatly improving the performance of an internal reforming SOFC. Under conventional feed compositions (i.e., SCR=2:1) these performance gains manifest as increased spatial uniformity in the temperature profile and thus lower thermal stresses on the electrolyte/electrode assembly. Furthermore, the distributed configuration allows for a reduction in the inlet SCR with little fear of carbon deposition. This reduction in steam content will result in lower pre-heating duty requirements and thus substantial efficiency gains.

While certain exemplary embodiments have been put forth to illustrate the present invention, these embodiments are not to be taken as limiting to the spirit or scope of the present invention which is defined by the appended claims. Thus, although the present invention has been described with reference to preferred embodiments, modifications and rearrangements could be made and still the result would be within the scope and spirit of the invention.

We claim:

1. A distributed feed fuel cell, comprising:
   an electrolyte disposed between an anode and a cathode;
   a fuel channel disposed along a surface of the anode opposite the electrolyte for delivering a fuel to the surface of the anode;
   an oxidant channel disposed along a surface of the cathode opposite the electrolyte for delivering an oxidant to the surface of the cathode; and
   a plurality of injection points disposed along a length of at least one of the fuel channel and the oxidant channel for introducing fuel or oxidant into the at least one of the fuel channel and the oxidant channel.

2. The distributed feed fuel cell of claim 1 wherein the fuel cell is a solid oxide fuel cell (SOFC).

3. The distributed feed fuel cell of claim 1 wherein the solid oxide fuel cell flat-plate SOFC stack.

4. The distributed feed fuel cell of claim 1 wherein the fuel cell is a molten carbonate fuel cell (MCFC).

5. The distributed feed fuel cell of claim 1 wherein the fuel cell has a feed flow rate sufficient to create an equal distribution of the at least one of the fuel or oxidant flow.

6. The distributed feed fuel cell of claim 1 wherein the plurality of injection points are at discrete locations within the fuel cell.

7. The distributed feed fuel cell of claim 1 further comprising an initial feed location at a front of each of the fuel and oxidant channels for introducing fuel into the fuel channel and oxidant into the oxidant channel.

8. The distributed feed fuel cell of claim 1 wherein the fuel cell is an internal steam reforming cell.

9. The distributed feed fuel cell of claim 1 wherein the fuel cell is an external steam reforming cell.

10. The distributed feed fuel cell of claim 1 wherein the fuel cell has a substantially uniform heat generation profile during operation due to substantially uniform reaction rates along the length of the channels.

11. The distributed feed fuel cell of claim 10 wherein the uniform temperature profile is between about 800 and about 1100° C.

12. The distributed feed fuel cell of claim 1 wherein the fuel cell generates a substantially uniform current density during operation.

13. The distributed feed fuel cell of claim 1 wherein the fuel cell has a distributed feed flow rate profile such that the hydrogen to steam ratio (HSR) is substantially spatially uniform during operation.

14. The distributed feed fuel cell of claim 1 having a steam to carbon ratio (SCR) of less than 1:1 for the fuel cell during operation.

15. The distributed feed fuel cell of claim 14 wherein the steam to carbon ratio (SCR) is about 1:2 for the fuel cell during operation.

16. The distributed feed fuel cell of claim 1, further comprising:
   a side feed channel disposed along at least a portion of the length of one of the fuel channel and the oxidant channel; and
   each of the plurality of injection points comprises a distribution channel connecting the side feed channel to the one of the fuel channel and the oxidant channel.

17. The distributed feed fuel cell of claim 16 wherein each of the fuel channel, the oxidant channel and the side channel is divided into a plurality of zones, at least two of said zones having different widths or different lengths or both.

18. The distributed feed fuel cell of claim 17 wherein each zone has a discrete fuel and oxidant injection point.

19. The distributed feed fuel cell of claim 16, further comprising a plurality of fuel channels and oxidant channels, wherein the distribution channel connects the side feed channel to one of the fuel channels and oxidant channels.

20. The distributed feed fuel cell of claim 19 wherein the fuel and oxidant channels are divided into a plurality of zones having at least two zones of different cross sectional areas.

21. The distributed feed fuel cell of claim 20 wherein each zone has a discrete fuel or oxidant injection point.

22. A distributed feed fuel cell comprising a stack of fuel cells, each fuel cell including:
   an electrolyte disposed between an anode and a cathode;
   a plurality of fuel channels disposed along a surface of the anode opposite the electrolyte for delivering a fuel to the surface of the anode;
   a plurality of oxidant channels disposed along a surface of the cathode opposite the electrolyte for delivering an oxidant to the surface of the cathode;

a fuel side feed channel disposed parallel to a portion of the fuel channels;

an oxidant side feed channel disposed parallel to a portion of the oxidant channels;

a plurality of fuel injection points disposed along the fuel side feed channel and connecting the fuel side feed channel to the plurality of fuel channels; and a plurality of oxidant injection points disposed along the oxidant fuel side feed channel and connecting the oxidant side feed channel to the plurality of oxidant channels.

23. The distributed feed fuel cell of claim 22 wherein the fuel cell is an internal steam reforming cell.

24. The distributed feed fuel cell of claim 18 wherein the fuel cell is a solid oxide fuel cell (SOFC).

25. The distributed feed fuel cell of claim 19 wherein the injection points are at discrete locations along the fuel cell.

26. The distributed feed fuel cell of claim 25 wherein the fuel cell has a substantially uniform heat generation profile during operation due to substantially uniform reaction rates along the length of the fuel cell channel.

27. The distributed feed fuel cell of claim 26 wherein the uniform temperature profile is between about 800 and about 1100° C.

28. The distributed feed fuel cell of claim 27 having a steam to carbon ratio (SCR) of less than 1:1 for the fuel cell during operation.

29. The distributed feed fuel cell of claim 28 wherein the steam to carbon ratio (SCR) is about 1:2 for the fuel cell during operation.

30. The distributed feed fuel cell of claim 22 wherein the fuel and oxidant channels are divided into a plurality of zones having at least two zones of different cross sectional areas.

31. The distributed feed fuel cell of claim 30 wherein each zone has a discrete fuel and oxidant injection point.

32. The distributed feed fuel cell of claim 22 wherein each of the fuel channel, the oxidant channel and the side channel is divided into a plurality of zones, at least two of said zones having different widths or different lengths or both.

33. The distributed feed fuel cell of claim 32 wherein each zone has a discrete fuel or oxidant injection point.

* * * * *